United States Patent
Sima et al.

(10) Patent No.: US 12,300,220 B1
(45) Date of Patent: May 13, 2025

(54) PITCH-BASED SPEECH CONVERSION MODEL TRAINING METHOD AND SPEECH CONVERSION SYSTEM

(71) Applicant: NANJING SILICON INTELLIGENCE TECHNOLOGY CO., LTD., Jiangsu (CN)

(72) Inventors: Huapeng Sima, Jiangsu (CN); Ran Xu, Jiangsu (CN)

(73) Assignee: NANJING SILICON INTELLIGENCE TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/999,918

(22) Filed: Dec. 23, 2024

(30) Foreign Application Priority Data

Dec. 28, 2023 (CN) .......................... 202311845426.2

(51) Int. Cl.
| | |
|---|---|
| *G10L 15/06* | (2013.01) |
| *G10L 21/013* | (2013.01) |
| *G10L 25/18* | (2013.01) |
| *G10L 25/30* | (2013.01) |
| *G10L 25/90* | (2013.01) |

(52) U.S. Cl.
CPC .......... *G10L 15/063* (2013.01); *G10L 21/013* (2013.01); *G10L 25/18* (2013.01); *G10L 25/30* (2013.01); *G10L 25/90* (2013.01); *G10L 2021/0135* (2013.01)

(58) Field of Classification Search
CPC ..... G10L 15/063; G10L 21/013; G10L 25/18; G10L 25/30; G10L 25/90; G10L 2021/0135
USPC ........................................................ 704/232
See application file for complete search history.

(56) References Cited

U.S. PATENT DOCUMENTS

2020/0135209 A1* 4/2020 Delfarah ................. G10L 17/04
2024/0087558 A1* 3/2024 Oplustil Gallegos ... G10L 13/08

FOREIGN PATENT DOCUMENTS

| CN | 113920977 A | | 1/2022 |
|---|---|---|---|
| CN | 114974218 A | | 8/2022 |
| CN | 116416964 A | * | 7/2023 |
| CN | 116665642 A | | 8/2023 |
| CN | 116741144 A | | 9/2023 |
| CN | 116959465 A | | 10/2023 |
| CN | 117133269 A | | 11/2023 |
| CN | 117373431 A | * | 1/2024 |

(Continued)

*Primary Examiner* — Paras D Shah
*Assistant Examiner* — Fouzia Hye Solaiman
(74) *Attorney, Agent, or Firm* — Bret E. Field; Bozicevic, Field & Francis LLP

(57) ABSTRACT

The present disclosure provides a pitch-based speech conversion model training method and a speech conversion system, wherein an audio feature code is output by a priori encoder, and a pitch feature is extracted by a pitch extraction module. A linear spectrum corresponding to the reference speech is input into the posteriori encoder to obtain an audio latent variable. In addition, the audio feature code, a speech concatenation feature obtained by concatenation of the audio feature code and the pitch feature, and the audio latent variable are input into a temporal alignment module to obtain a converted speech code, and the converted speech code is decoded by a decoder to obtain a converted speech. The training loss of the converted speech is then calculated to determine the degree of convergence of the speech conversion model.

5 Claims, 7 Drawing Sheets

(56) References Cited

FOREIGN PATENT DOCUMENTS

| | | |
|---|---|---|
| KR | 20230103242 A | 7/2023 |
| WO | WO2022121157 A1 | 6/2022 |

\* cited by examiner

PITCH-BASED SPEECH CONVERSION MODEL TRAINING METHOD AND SPEECH CONVERSION SYSTEM

CROSS-REFERENCE TO RELATED APPLICATION

The present disclosure claims priority to Chinese Patent Application No. 202311845426.2, filed on Dec. 28, 2023, entitled "pitch-based speech conversion model training method and speech conversion system", which is incorporated herein by reference in its entirety.

FIELD OF THE PRESENT DISCLOSURE

The present disclosure relates to the technical field of speech conversion, and more particularly to a pitch-based speech conversion model training method and a speech conversion system.

BACKGROUND OF THE PRESENT DISCLOSURE

The speech conversion technology is a technology for converting speech of a person into another's through a speech conversion model. However, in order to obtain one's high-quality speech, a large amount of sample data is required to train the speech conversion model so as to obtain more authentic voice of characters through the speech conversion technology.

In an actual training process, it is often difficult to obtain a large amount of sample data, and only a small amount of sample data can be used to train the speech conversion model. There is a certain gap between the speech of a character generated by the speech conversion model trained by a small amount of sample data and speech of a real person, since character speech is more varied in timbre and rhythm due to the rich expression of natural speech of a person.

In order to shorten the gap of speech, when training the speech conversion model using a small amount of sample data, a method of pre-training and model fine-tuning can be used, i.e., pre-training the speech conversion model on a data set of a large amount of audio data, and then fine-tuning the speech conversion model using a small amount of sample data. However, in a case of a small amount of sample data, there is still a problem that the pitch similarity between converted speech of a character and speech of a real person is low.

SUMMARY OF THE PRESENT DISCLOSURE

In order to reduce the problem that the pitch similarity between converted speech of a person and speech of a real person is low in a case of a small amount of sample data, a pitch-based speech conversion model training method and a speech conversion system are proposed according to the embodiments of the present disclosure.

In a first aspect the present disclosure, there is provided a pitch-based speech conversion model training method applied to training a speech conversion model, the speech conversion model including a priori encoder, a posteriori encoder, a temporal alignment module, a decoder and a pitch extraction module, the method including:
  inputting a reference speech to the priori encoder and the pitch extraction module, and extracting an audio feature code by the priori encoder and a pitch feature by the pitch extraction module;
  performing feature concatenation on the audio feature code and the pitch feature to obtain a speech concatenation feature;
  inputting a linear spectrum corresponding to the reference speech into the posteriori encoder to obtain an audio latent variable;
  aligning a temporal sequence of the speech concatenation feature and the audio latent variable by the temporal alignment module to obtain a converted speech code;
  decoding the converted speech code by the decoder to obtain converted speech; and
  calculating a training loss of the converted speech, and outputting the speech conversion model according to a current parameter of a model to be trained if the training loss is less than or equal to a training loss threshold, or performing iterative training on the speech conversion model if the training loss is greater than the training loss threshold, wherein the model to be trained is an untrained converged speech conversion model.

In some embodiments, the pitch extraction module includes an encoder layer, a filter layer, an intermediate layer, and a decoder layer;
  the encoder layer, the intermediate layer and the decoder layer form a first encoding branch of the pitch extraction module, and the encoder layer, the filter layer and the decoder layer form a second encoding branch of the pitch extraction module.

In some embodiments, the encoder layer includes an average pooling layer and a convolution network, and the step of extracting the pitch feature by the pitch extraction module includes:
  extracting a pitch feature vector of the reference speech through the convolution network;
  performing down-sampling on the pitch feature vector by the average pooling layer to obtain a pitch feature code; and
  decoding the pitch feature code by the decoder layer to obtain the pitch feature.

In some embodiments, the convolution network includes a convolutional block including a 2D convolutional layer, a batch normalizing layer and a relu function, and the step of extracting the pitch feature vector of the reference speech through the convolution network includes:
  extracting a deep-level audio vector by the 2D convolutional layer;
  performing accelerated convergence processing on the deep-level audio vector by the batch normalizing layer to extract a convergence pitch feature from the deep-level audio vector; and
  adding a non-linear relationship to the converged pitch feature via the relu function to obtain the pitch feature vector.

In some embodiments, a shortcut convolutional layer is provided between an input of the convolution network and an output of the convolution network, and before the step of adding a non-linear relationship to the converged pitch feature through the relu function, the method further includes:
  extracting a shortcut pitch feature by the shortcut convolutional layer;
  concatenating the shortcut pitch feature and the converged pitch feature to obtain a pitch concatenation feature; and adding the non-linear relationship between the pitch concatenation features via the relu function to obtain the pitch feature vector.

In some embodiments, the decoder layer includes a deconvolution layer and the convolution network, and the step of decoding the pitch feature code by the decoder layer includes:

performing deconvolution calculation on the pitch feature code by the deconvolution layer to obtain a deconvolution feature vector; and decoding the deconvolution feature vector through the convolution network to obtain the pitch feature.

In some embodiments, the step of aligning a temporal sequence of the speech concatenation feature and the audio latent variable by the temporal alignment module includes:

acquiring a template speech sequence of the temporal alignment module;

aligning a temporal sequence of the speech concatenation feature and the audio latent variable according to the template speech sequence; and encoding the aligned speech concatenation feature and the audio latent variable to obtain a converted speech code.

In some embodiments, the speech conversion model further includes a style encoder, and after the step of performing feature concatenation on the audio feature and the pitch feature, the method further includes:

extracting a style feature of the reference speech by the style encoder; and mapping the style feature into the speech concatenation feature to update the speech concatenation feature.

In some embodiments, the training loss includes a spectrum loss, and the step of calculating the training loss of the converted speech includes:

acquiring a spectral accuracy of the reference speech and a spectral accuracy of the converted speech; and calculating the spectrum loss from the spectral accuracy of the reference speech and the spectral accuracy of the converted speech according to the following formula:

$$L_{recon}=\|x_{mel}-\hat{x}_{mel}\|;$$

where $L_{recon}$ is a spectrum loss, $x_{mel}$ is spectral accuracy of the reference speech, and $\hat{x}_{mel}$ is the spectral accuracy of the converted speech.

In a second aspect of the present disclosure, there is provided a speech conversion system, wherein the speech conversion system includes a speech conversion model obtained by training according to the pitch-based speech conversion model training method according to the first aspect, the speech conversion model comprising a priori encoder, a posteriori encoder, a temporal alignment module, a decoder and a pitch extraction module, wherein the priori encoder is configured to extract an audio feature code of a reference speech;

the pitch extraction module is configured to extract a pitch feature of the reference speech;

the posteriori encoder is configured to generate an audio latent variable from a linear spectrum corresponding to the reference speech;

the temporal alignment module is configured to align a temporal sequence of a speech concatenation feature and the audio latent variable to obtain a converted speech code, and the speech concatenation feature is obtained by concatenating the audio encoding feature and the pitch feature extraction; and the decoder is configured to decode the converted speech code to obtain converted speech.

It can be seen from the above-mentioned technical solutions that the present disclosure provides a pitch-based speech conversion model training method and a speech conversion system, where the method is used for training a speech conversion model, the speech conversion model including a priori encoder, a posteriori encoder, a temporal alignment module, a decoder and a pitch extraction module. According to the embodiments of the present disclosure, a reference speech may be input to the priori encoder and the pitch extraction module to output an audio feature code by the priori encoder and to extract a pitch feature by the pitch extraction module. A linear spectrum corresponding to the reference speech is input into the posteriori encoder to obtain an audio latent variable. In addition, a speech concatenation feature obtained by concatenation of the audio feature code and the pitch feature, and the audio latent variable are input into a temporal alignment module to obtain a converted speech code, and the converted speech code is decoded by a decoder to obtain a converted speech. The training loss of the converted speech is then calculated to determine the degree of convergence of the speech conversion model. In the present disclosure extracting a pitch feature of a reference speech through a pitch extraction module, and performing concatenation and alignment with an audio feature code, so that the pitch feature of the converted speech is closer to the speech of a real person, thereby improving the pitch similarity of the converted speech in a case of insufficient speech samples.

BRIEF DESCRIPTION OF THE DRAWINGS

In order to explain the technical solution of the present disclosure more clearly, the following will briefly introduce the drawings which need to be used in the embodiments, and it would be obvious for a person skilled in the art to obtain other drawings according to these drawings without involving any inventive effort.

DESCRIPTION OF THE EMBODIMENTS

Figure 1:
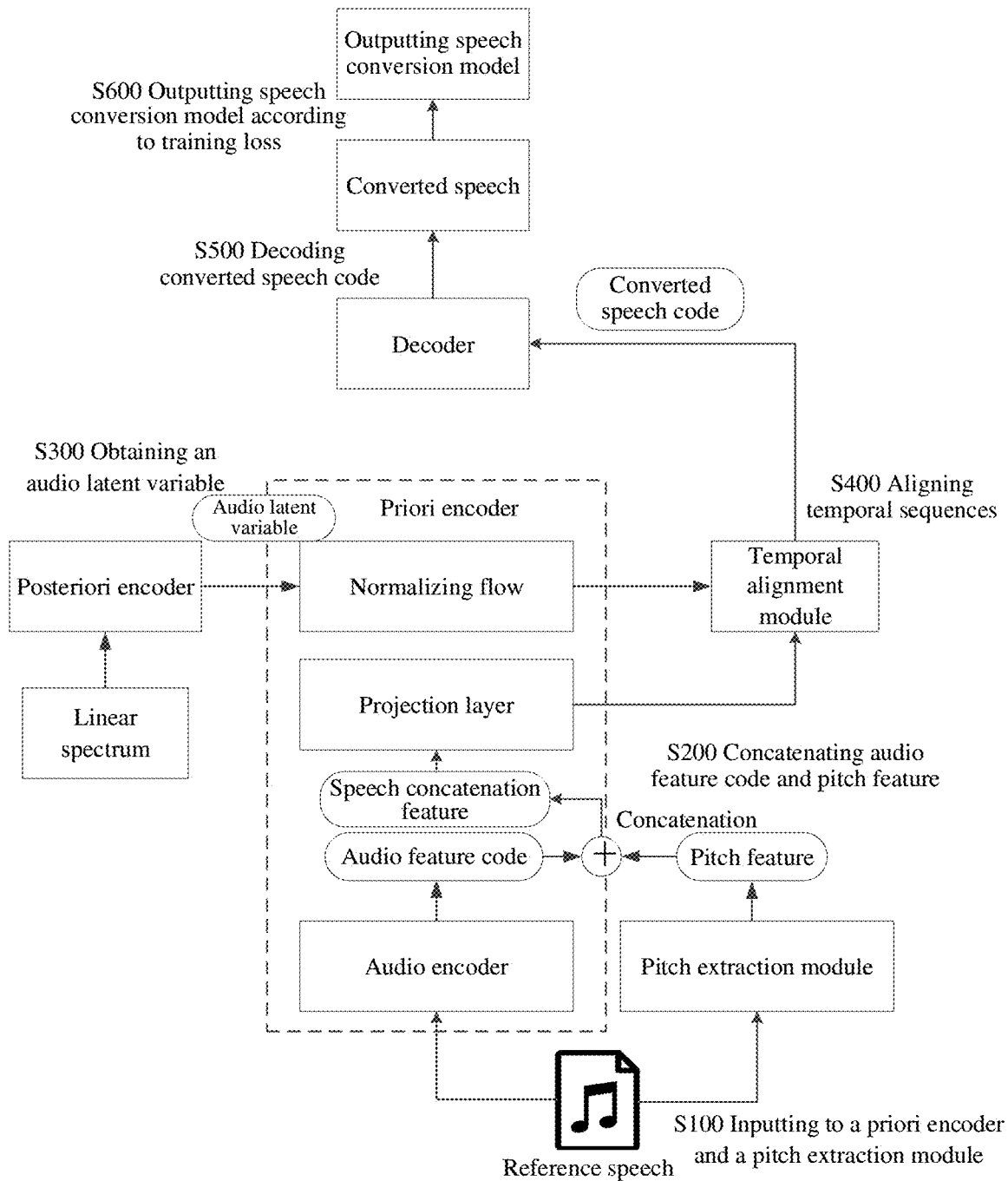
FIG. 1 is a flowchart of a pitch-based speech conversion model training method according to an embodiment of the present disclosure.

Hereinafter, embodiments of the present disclosure will be described in detail in conjunction with the embodiments with reference to the accompanying drawings. It should be noted that the embodiments and features of the embodiments in the present disclosure can be combined with each other without conflict.

It should be noted that the terms "first", "second", and the like in the description and in the claims of the present disclosure and in the above-mentioned drawings are used for distinguishing between similar objects and not necessarily for describing a particular sequential or chronological order.

The speech conversion technology is a technology for converting speech of a person into another's through a speech conversion model, for example, when a user drives a digital person generated in his/her own image, he/she wants to speak with the digital person in another sound than the user's own speech so as to enhance the interest of the interaction of the digital person. At this time, the user can convert his/her own speech into another's through the speech conversion technology, thereby achieving a purpose of speech conversion.

In order to improve the accuracy of speech conversion and obtain high-quality converted speech of a person, a large amount of sample data is needed to train the speech conversion model to obtain more authentic voice of characters through the speech conversion technology.

However, in the actual training process, it is often difficult to obtain a large amount of sample data, and only a small amount of sample data can be used to train the speech conversion model. There is a certain gap between the speech of a person generated by the speech conversion model trained by a small amount of sample data and speech of a real person, since character speech is more varied in timbre and rhythm due to the rich expression of natural speech of a person.

In a case of fixed language content, a speaker's timbre and pitch are relevant factors affecting the speaker's personality. In a case of large amount of data of the speaker, the speech conversion technology will present a good conversion result. However, in a case where the amount of data of the speaker is small, the effect of speech conversion technology on the speaker's timbre and pitch is poor.

In some embodiments, when training the speech conversion model using a small amount of sample data, pre-training and model fine-tuning can be used to reduce the gap between the synthesized speech of a character and the speech of a real person, i.e., pre-training the speech conversion model on a data set of a large amount of audio data, and then fine-tuning the speech conversion model using a small amount of sample data. However, in a case of a small amount of sample data, there is still a problem that the pitch similarity between a synthesized speech of character and speech of a real person is low In order to solve the problem that the pitch similarity between a converted speech of character and speech of a real person is low in a case of a small amount of sample data, in some embodiments of the present disclosure, there is provided a pitch-based speech conversion model training method for training a speech conversion model, where a use stage of the speech conversion model includes a pre-training stage, a learning training stage and an application stage.

In the pre-training stage of the speech conversion model, the speech conversion model can be pre-trained by training speech so that the speech conversion model has basic speech conversion capabilities. In the process of pre-training, the training speech used can be obtained in various ways, for example, extracting a corresponding audio file in a video media to be used as the training speech, and in the present example, if the duration of the audio file is longer, the audio file can be segmented so as to obtain a plurality of training speech segments. Alternatively, according to some embodiments of the present disclosure, speech synthesis may also be performed on a preset text so as to obtain training speech, and the method for acquiring training speech is not excessively limited in the present disclosure.

It should be noted that since the training speech is used to perform the pre-training process on the speech conversion model, the training speech should include the character speech of at least one character to perform the training of the speech conversion on the speech of a character in the pre-training process of the speech conversion model.

The training method provided according to an embodiment of the present disclosure is used for training the learning training stage of the speech conversion model. In the learning training stage, the speech conversion model includes a priori encoder, a posteriori encoder, a temporal alignment module, a decoder, and a pitch extraction module. The priori encoder includes a normalizing flow layer, a projection layer and an audio encoder.

It should be noted that, in the embodiment of the present disclosure, an audio feature code and a pitch feature may be added as a core algorithm of a speech conversion model on the basis of a speech synthesis algorithm, for example, a Versatile and Interpretable Text-to-Speech (VITS) algorithm may be used as a basic synthesis algorithm of the speech conversion model, and an audio encoder and an RMPVE pitch extraction algorithm may be added as a core algorithm of the speech conversion model on the basis of the above algorithm.

The VITS algorithm is a highly expressive speech synthesis algorithm combining variational inference, normalizing flow and adversarial training. By using latent variables instead of acoustic models and vocoders in spectral tandem speech synthesis, the diversity of synthesized speech can be improved by stochastic modeling on latent variables and using a stochastic duration predictor. The above is merely an example of an embodiment of the present disclosure, and in practice, other speech synthesis algorithms may also be used to incorporate the speech conversion model of an embodiment of the present disclosure.

FIG. 1 is a flowchart of a pitch-based speech conversion model training method according to an embodiment of the present disclosure. With reference to FIG. 1, the training method includes:

S100: inputting a reference speech to the priori encoder and the pitch extraction module, and extracting an audio feature code by the priori encoder and extracting a pitch feature by the pitch extraction module.

The reference speech is a speech to be learned by the speech conversion model, for example, the user inputs the speech of character A into the speech conversion model to output the speech of a character B according to a textual content as same as that of the speech of the character A through the speech conversion model. The speech of the character B is a reference speech, and after the speech conversion model completes learning and training the reference speech, when inputting the target to be converted into the speech conversion model, the speech conversion model can perform speech conversion on the target speech with the speech feature of the reference speech so as to obtain the converted speech.

It should be noted that the reference speech and the training speech are speech samples applied at two different stages of the speech conversion model, where the training speech is used for training the speech conversion model at a pre-training stage of the speech conversion model so that the speech conversion model has basic speech conversion capabilities. The reference speech is used to perform training on the speech conversion model during a learning training stage of the speech conversion model to enable the speech conversion model to convert speech features of the input speech into speech features of the reference speech.

In the present embodiment, in a learning training process of the speech conversion model, the reference speech needs to be input to an audio encoder in a priori encoder to extract an audio feature code of the reference speech by the audio encoder. At the same time, in order to make the pitch of the converted speech output by the speech conversion model more consistent with the pitch of the speech of a real person, the reference speech can also be synchronously input to the pitch extraction module, so as to extract the pitch features of the reference speech by the pitch extraction module, thereby improving the learning accuracy of the reference speech by the speech conversion model.

In some embodiments, a priori encoder may also recognize the textual content of the reference speech and extract features of the textual information based on the textual content to improve the learning accuracy of the reference speech by the speech conversion model.

It should be noted that for better extraction of audio features, the reference speech may be pre-processed before being input to the audio encoder. For example, a reference speech is processed into a Mel spectrum, and the Mel spectrum is input to an audio encoder, so that an audio feature of the Mel spectrum and a text feature corresponding to the reference speech are extracted by the audio encoder, and the audio feature and the text feature are compressed and encoded to output an audio feature code, so as to improve the accuracy of the speech obtained by subsequent conversion.

Figure 2:
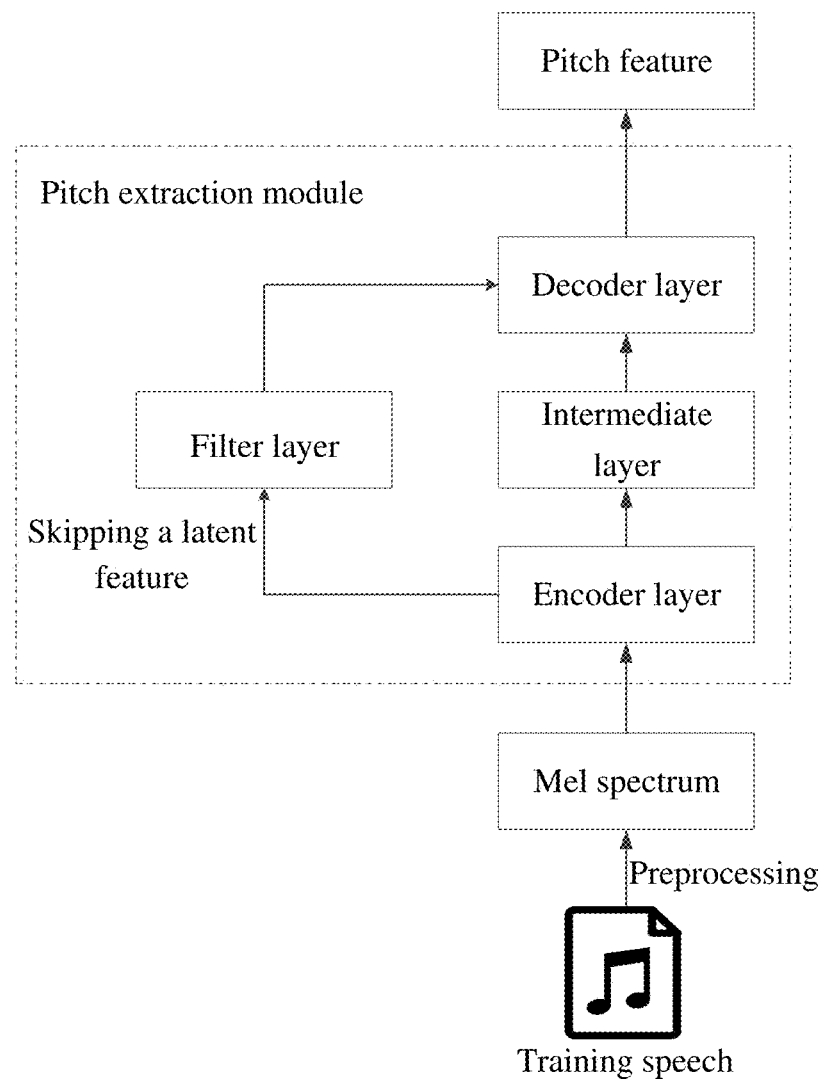
FIG. 2 is a schematic structural diagram of a pitch extraction module according to an embodiment of the present disclosure.

In some embodiments, the pitch extraction module may include an Encoder Layer, a filter layer (Skip Latent Feature Filter), an Intermediate layer and a Decoder layer, as shown in FIG. 2, where two encoding branches may be included in the pitch extraction module. The encoder layer, the intermediate layer and the decoder layer form a first encoding branch of the pitch extraction module, and the encoder layer, the filter layer and the decoder layer form a second encoding branch of the pitch extraction module.

An encoder layer is used for performing encoding on the reference speech, and in a first encoding branch, an intermediate layer is used for extracting high-level pitch features of the reference speech through a plurality of convolutional layers, and in a second encoding branch, a filter layer is used for skipping latent features in the reference speech and extracting low-level pitch features in the reference speech through the convolutional layers. The decoder layer is used for performing a deconvolution operation on the high-level pitch features and low-level pitch features extracted by the first encoding branch and the second encoding branch, so as to complete decoding and obtain pitch features.

Figure 3:
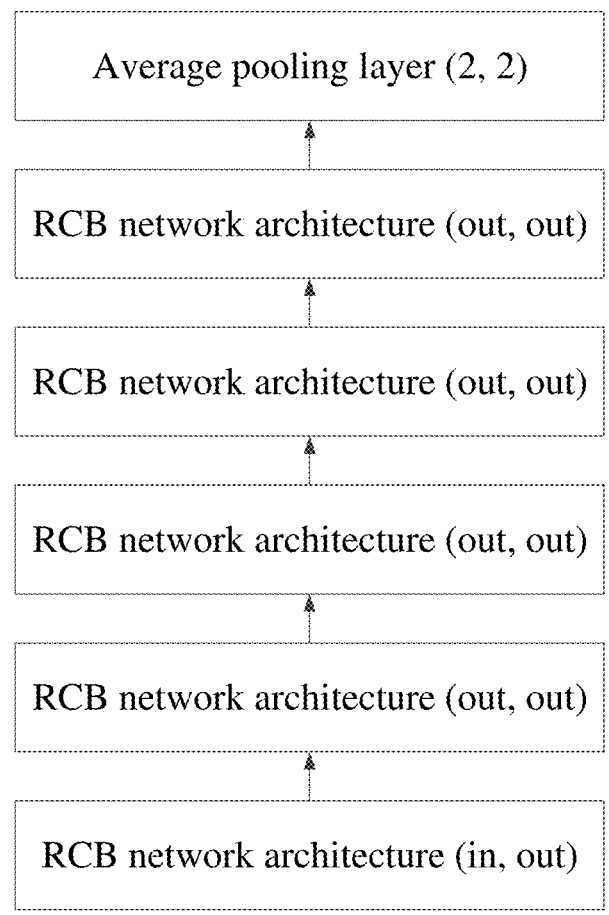
FIG. 3 is a schematic structural diagram of an REB network architecture according to an embodiment of the present disclosure.

In some embodiments, the encoder layer may include a pre-set number of REB network architectures, as shown in FIG. 3, the REB network architecture includes a multi-layer RCB convolution network and a 2×2 average pooling layer (Avgpool), and therefore, in the process of extracting pitch features of the reference speech by the pitch extraction module, a pitch feature vector of the reference speech may be extracted by the RCB convolution network.

In the REB network architecture, a multi-layer RCB convolution network is included, a 2×2 average pooling layer is arranged behind the last layer of the RCB convolution network, and down-sampling can be performed, by the average pooling layer, on a pitch feature vector output by the RCB convolution network to obtain a pitch feature code, and the pitch feature code then is decoded by a decoder layer to obtain the pitch feature.

Since the encoder layer includes a multi-layer REB network architecture, which can successively increase the dimensions for extracting the pitch features according to the input order, so as to extract the pitch features from a shallow level to a deep level. For example, the first layer of the REB network architecture extracts the dimensions as (1, 16), the second layer of the REB network architecture extracts the dimensions as (16, 32), the third layer of the REB network architecture extracts the dimensions as (32, 64), and so on, so as to gradually extract the pitch features stably and improve the extraction accuracy of the pitch features.

Figure 4:
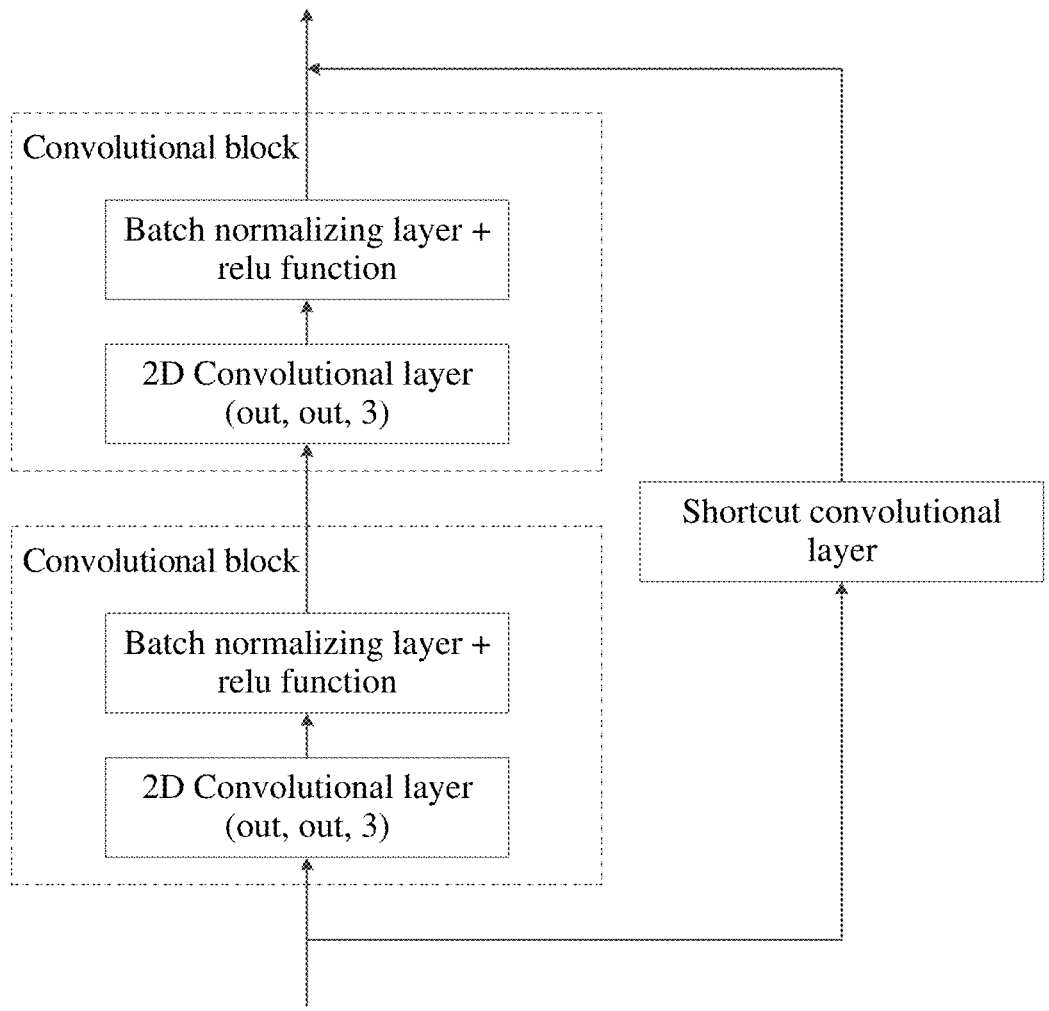
FIG. 4 is a schematic structural diagram of an RCB convolution network architecture according to an embodiment of the present disclosure.

In some embodiments, the RCB convolution network may include a plurality of convolutional blocks, as shown in FIG. 4, the convolutional blocks may include a 2D convolutional layer, a batch normalizing layer, and a relu function, with the batch normalizing layer and the relu function disposed behind each 2D convolutional layer. In the process of extracting pitch feature vectors by RCB convolution network, deep-level audio vectors can be extracted by the 2D convolutional layer. In the present embodiment, the accuracy of the audio vector can be determined by setting the number of layers of the 2D convolutional layer; it should be noted that the more the 2D convolutional layers are set, the higher the accuracy of the audio vector should be; when the accuracy of the audio vector reaches the maximum, the number of layers of the 2D convolutional layer is the maximum number of layers; even if the 2D convolutional layer is further added on the basis of the maximum number of layers, the accuracy of the audio vector cannot be further improved.

After extracting the audio vector from the 2D convolutional layer, the audio vector needs to be input into the batch normalizing layer of the corresponding convolutional block, and accelerated convergence processing may be performed on the deep-level audio vector by the batch normalizing layer so as to extract the convergence pitch feature from the deep-level audio vector and improve the convergence speed of the RCB convolution network, thereby improving the efficiency of speech conversion.

After obtaining the converged pitch feature, a non-linear relationship can be added to the converged pitch feature through the relu activation function, and the non-linear characteristic is introduced into the convolutional block to obtain the pitch feature vector, so that the pitch feature vector output by the current convolutional block can be used as the input of the next convolutional block, so as to extract the pitch feature of the reference speech through the multi-layer 2D convolutional layer, thereby obtaining the pitch feature vector finally output by the convolutional block. It should be noted that in order to improve the efficiency of extracting the pitch feature of the reference speech, in the embodiment of the present disclosure, the size of an optimal convolution kernel of the 2D convolutional layer of the convolutional block may be 3×3, and in practice, the size of the convolution kernel may also be adjusted to be 2×2 or 4×4 according to the efficiency required by the disclosure, and the size of the convolution kernel is not particularly limited in the present disclosure.

In some embodiments, a shortcut convolutional layer is also provided between the input and the output of the RCB convolution network. To this end, shortcut pitch features can be extracted by the shortcut convolutional layer before adding a non-linear relationship to the converged pitch features by the relu activation function, where the shortcut convolutional layer includes only one 2D convolutional layer. It should be noted that the speed at which the shortcut convolutional layer extracts a shortcut pitch feature is greater than the speed at which the convolutional block extracts a pitch feature vector, and therefore the convolution kernel of the shortcut convolutional layer should be less than the convolution kernel of the 2D convolutional layer of the convolutional block, for example, the size of the convolution kernel of the shortcut convolutional layer may be 1×1.

After the shortcut pitch feature is extracted by the shortcut convolutional layer, the shortcut pitch feature can be concatenated with the converged pitch feature output by the batch normalizing layer to obtain a pitch concatenation feature by combining the pitch features extracted according to different dimensions. Then, the relu activation function is used to add the non-linear relationship between the pitch concatenation features, so that the speech concatenation features are used as the input of the next convolutional block, thereby obtaining the pitch feature vector output by the next convolutional block.

In some embodiments, the intermediate layer may include a plurality of ICB network architectures, where the ICB network architectures are similar to the REB network architectures except that the ICB network architectures do not have an average pooling layer. The intermediate layer can extract the deeper level of the pitch feature in the pitch feature code through the ICB network architecture and output it in the format of pitch feature code.

In some embodiments, the filter layer includes a multi-layer RCB convolution network, and the RCB convolution network in the filter layer may also be arranged in the same order as the dimensions of the REB network architecture according to the input order, and the dimensions for extracting pitch features are successively increased so as to extract pitch features from a shallow level to a deep level. Through the above-mentioned network architecture, the U-Net structure composed of a 2D convolutional layer and a deconvolution layer acquires a reference speech depth pitch feature, so as to facilitate improving the pitch similarity between the converted speech output by the subsequent speech conversion model and the speech of a real person.

Figure 5:
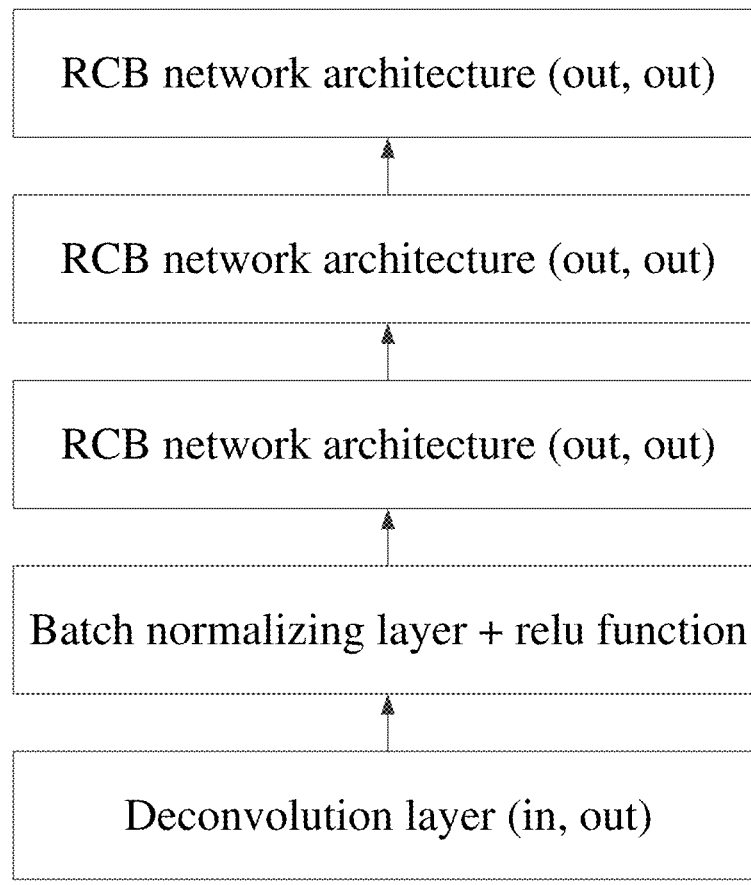
FIG. 5 is a schematic structural diagram of a network architecture of a decoder layer according to an embodiment of the present disclosure.

In some embodiments, the decoder layer includes a multi-layer RDB network architecture, as shown in FIG. 5, the RDB network architecture includes a deconvolution layer and an RCB convolution network, a layer of batch normalizing layer and a relu activation function can be accessed between the deconvolution layer and the RCB convolution network, and the effects of the batch normalizing layer and the relu activation function in the decoder layer can refer to the effects in the above-mentioned encoder layer, which will not be described in detail in the embodiments of the present disclosure.

In the present embodiment, the decoder layer needs to decode the pitch feature code finally output by the intermediate layer and the filter layer, and therefore, firstly it is needed to perform a deconvolution calculation on the pitch feature code through the deconvolution layer to obtain a deconvolution feature vector, then improves the convergence speed of the decoder layer by the batch normalizing layer, and introduces a non-linear characteristic to the RCB convolution network in the decoder layer through the relu activation function.

After outputting the deconvolution feature vectors by the batch normalizing layer, the deconvolution feature vectors are decoded hierarchically through the RCB convolution network to complete the extraction of the pitch features of the reference speech.

S200: performing feature concatenation on the audio feature code and the pitch feature to obtain a speech concatenation feature.

In order to facilitate the combination of the pitch feature and the audio feature code, a concatenation process may be performed on the audio feature code and the pitch feature to obtain a speech concatenation feature of the reference speech. In speech concatenation features, a pitch feature can be mapped into an audio feature code, so that the pitch feature is better incorporated into the audio feature code.

S300: inputting a linear spectrum corresponding to the reference speech into the posteriori encoder to obtain an audio latent variable.

In the learning and training process of the speech conversion model, a corresponding linear spectrum can be generated according to a reference speech, and then the linear spectrum is input to a posteriori encoder, and an audio latent variable corresponding to the reference speech is output according to the posteriori encoder.

It should be noted that the audio latent variables are only generated by a posteriori encoder in a learning and training process, and by the normalizing flow layer in a priori encoder of the speech conversion model during the application. The posteriori encoder can use a non-causal WaveNet residual module in WaveGlow and Glow-TTS, and the non-causal WaveNet residual module in the WaveGlow and Glow-TTS is only applied in a learning and training process, without participating in an application process of the speech conversion model.

S400: aligning a temporal sequence of the speech concatenation feature and the audio latent variable by the temporal alignment module to obtain a converted speech code.

Before performing speech conversion, it is necessary to ensure that the speech concatenation features and the audio latent variables can correspond in a temporal sequence, so as to alleviate the problem that the converted speech is not synchronized with respect to the sound and picture generated by the reference speech. To this end, the speech concatenation feature and the audio latent variable may be input to the temporal alignment module, so that the converted speech code is output according to the temporal alignment module aligning the temporal sequence of the speech concatenation feature and the audio latent variable.

In some embodiments, the reference speech may also be input into a projection layer of the priori encoder, so that the speech concatenation feature of the reference speech is projected into the temporal alignment module through the projection layer, so as to better combine the speech concatenation feature and the audio latent variable, and improve the accuracy of the fusion of the speech concatenation feature to the converted speech code.

The temporal alignment module may employ a Monotonic Alignment Search (MAS) alignment estimation algorithm which is an algorithm used in audio signal processing to align a speech sequence with a template so as to perform an alignment operation.

To this end, in some embodiments, in the process of inputting the speech concatenation features and the audio latent variables into the temporal alignment module, when it is necessary to perform temporal alignment on the speech concatenation features and the audio latent variables according to a specific template speech sequence, in the present embodiment, a template speech sequence of the temporal alignment module can be acquired, where the template speech sequence is a speech sequence of a specified textual content spoken through a pre-set speech speed, intonation and pitch within a pre-set duration. The template speech sequence serves as a reference in aligning the speech concatenation features and audio latent variables. According to the MAS alignment estimation algorithm, the speech concatenation feature and the audio latent variable can be aligned through the template speech sequence by the temporal alignment module, and the aligned speech concatenation feature and the audio latent variable may be encoded to obtain the converted speech code.

In some embodiments, before inputting the speech concatenation feature and the audio latent variable into the temporal alignment module, the speech concatenation feature and the audio latent variable are firstly input into a normalizing flow layer, so as to enhance the complexity of the priori distribution of the speech concatenation feature and the audio latent variable by the normalizing flow layer, thereby improving the complexity of the pitch concatenation feature, strengthening the efficiency of the speech conversion model to learn the pitch feature, and improving the pitch similarity between the converted speech output by the speech conversion model after the training and speech of a real person.

S500: decoding the converted speech code by the decoder to obtain converted speech.

In the present embodiment, in order to better combine the speech concatenation feature of the reference speech, the combining process and the temporal alignment process need to be performed on the speech concatenation feature and the audio latent variable in an encoding state. However, the converted speech of the encoding state cannot be output by the speech conversion model, and therefore, it is necessary to input the converted speech code into the decoder of the speech conversion model, so that the converted speech code is decoded by the decoder to obtain the converted speech.

In the present embodiment, a generator of a vocoder HiFi-GAN V1 may be used as the decoder, and generators of other vocoders may also be used, and the embodiments of the present disclosure do not over limit the type of the vocoder used by the decoder.

S600: calculating a training loss of the converted speech, and outputting the speech conversion model according to a current parameter of a model to be trained if the training loss is less than or equal to a training loss threshold, or performing iterative training on the speech conversion model if the training loss is greater than the training loss threshold.

Figure 6:
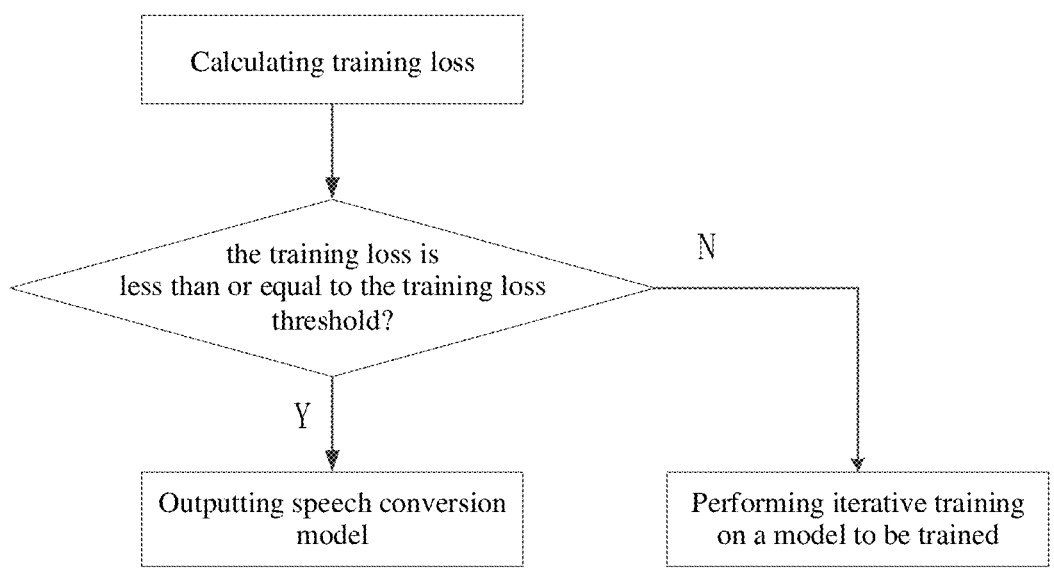
FIG. 6 is a schematic flow diagram showing outputting a speech conversion model based on a training loss according to an embodiment of the present disclosure.

After the converted speech is obtained, it is indicated that the speech conversion model has completed a learning and training process, and at this time, the training loss of the current converted speech can be calculated so as to judge the learning and training progress of the speech conversion model. As shown in FIG. 6, if the training loss is less than or equal to the training loss threshold, it is indicated that the speech conversion model has been trained to converge, at which time the speech conversion model can be output according to the current parameters of the model to be trained.

It should be noted that, when a speech conversion model reaches a convergence state after learning and training is completed, the application stage of the speech conversion model can be entered; in order to facilitate distinguishing speech conversion models with different training levels, in the embodiment of the present disclosure, the speech conversion model which is not trained to convergence is defined as a model to be trained.

If the training loss is greater than the training loss threshold, it is indicated that the speech conversion model is not trained to converge; at this moment, the model to be trained needs to continue to be trained by referring to the speech so as to perform iterative training on the model to be trained; after each iterative training, the training loss is calculated again until the training loss is less than or equal to the training loss threshold, and the speech conversion model is trained to converge. In this way, in the application process, the speech conversion model can output the converted speech with high pitch similarity and high speech accuracy between the target speech and the speech of a real person through the target speech.

In some embodiments, the speech conversion model may further include a style encoder and a prosodic encoder, where after the audio feature code and the pitch feature are performed feature concatenation, a reference speech or a Mel spectrum corresponding to the reference speech may further be input into the style encoder to extract a style feature of the reference speech through the style encoder and the obtained style feature may be mapped into a speech concatenation feature, thereby updating the speech concatenation feature, so that the speech concatenation feature retains both the speech concatenation feature and the style feature of the reference speech.

In some embodiments, the style encoder may select a MelStyleEncoder module, which includes three sub-modules: a Spectral processing layer, a Temporal processing layer and a Multi-head attention layer.

Specifically, the composition and operation mode of the style encoder module are as follows:

the spectral processing layer consists of a full connection layer, which is used to acquire the Mel spectrum of the input training speech and convert it into a feature sequence;

the temporal processing layer includes a gated convolutional layer and a residual layer for acquiring temporal information in the feature sequence;

the multi-head attention layer is used for extracting a style feature corresponding to a corresponding feature sequence within a first pre-set duration according to temporal sequence information, and repeating the operation, where the first pre-set duration is a short duration at a frame level, and the above-mentioned operation respectively extracts a corresponding style feature in a plurality of short durations; on this basis, in a second pre-set duration, a plurality of style features corresponding to a plurality of first pre-set durations are averaged to obtain a style vector; generally, the second pre-set duration is a long duration, and the second pre-set duration includes the first pre-set duration.

After inputting Mel spectrum corresponding to the reference speech to the Style Encoder, the Spectral processing sub-module in the Style Encoder can convert the input Mel spectrum into a frame-level latent state sequence through a full connection layer. The Temporal processing sub-module can capture temporal information in the reference speech through Gated CNN and residual connection. The Multi-head attention sub-module can encode global information through a multi-headed self-attention mechanism and residual connection, where multi-headed self-attention is used at the frame level to better extract style features from shorter reference speech and then output a style vector Style Embeddings averaged over time.

In some embodiments, the above-mentioned style encoder may further include a style adaptation unit including one normalizing layer and one full connection layer for predicting corresponding feature offsets and feature gains from the aforementioned style vectors and outputting them as style information for speech and for subsequent speech conversion. In the traditional speech conversion process, the follow-up operation is carried out based on the style features obtained by audio only. In order to achieve better results, a larger amount of training samples are needed to achieve more accurate style extraction. With the above improvement, the style information is adaptively changed according to the change of the style vector, with the more accurate reproduction of the style and the smaller demand for training speech.

In some embodiments, a text encoder may also be included in a priori encoder, the text encoder may cooperate with a prosodic encoder to extract prosodic features of the reference speech. In the present embodiment, reference text, i.e., text corresponding to the speech content in the reference speech, may be input in a text encoder, which may extract text features from the reference text. Meanwhile, the text feature may be input into the prosodic encoder together with the reference speech, and the prosodic encoder may output the prosodic feature according to the text feature and the reference speech.

In the present embodiment, the prosodic encoder can adopt a ProsodyEncoder module, which can extract the prosodic features from the reference speech through a word-level vector quantization bottleneck.

Figure 7:
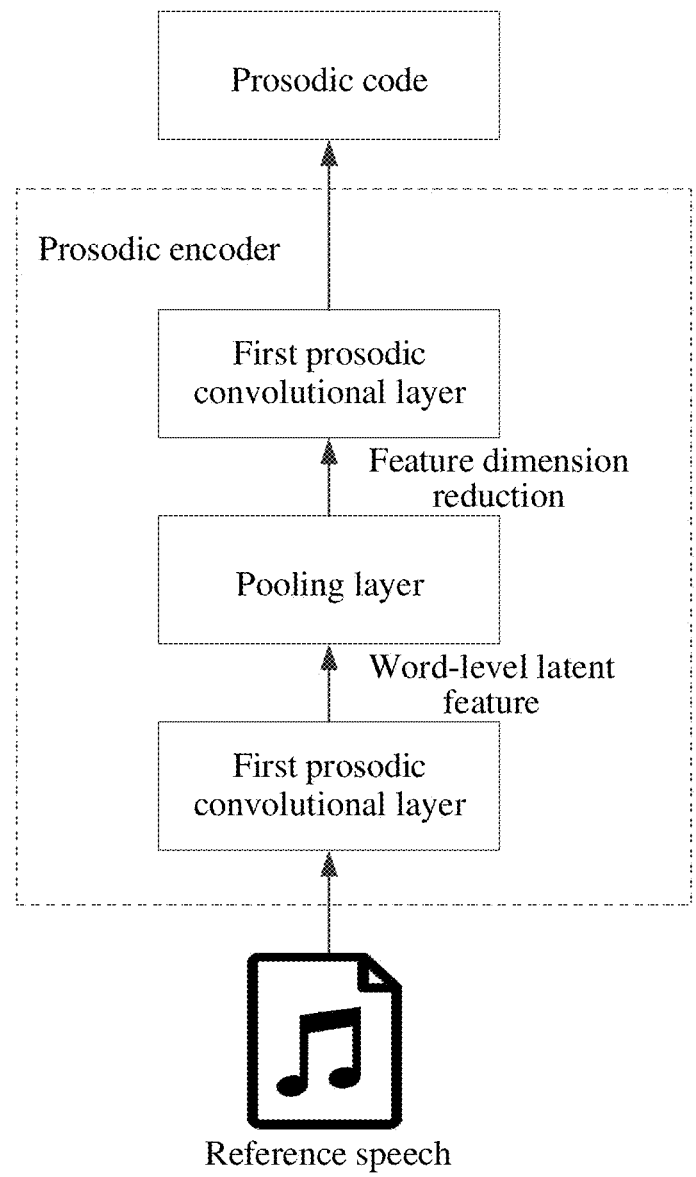
FIG. 7 is a schematic diagram of a prosodic encoder according to an embodiment of the present disclosure.

In some embodiments, as shown in FIG. 7, the prosodic encoder includes a prosodic convolutional layer and a pooling layer, where the prosodic convolutional layer includes a relu activation function and a normalizing layer, and the relu activation function can remove the linearization of the prosodic encoder so as to enable the prosodic convolutional layer to have a non-linear expression capability to fit deeper prosodic features and improve the accuracy of extracting the prosodic features. The normalizing layer is used to normalize the samples of each reference speech so as to improve the convergence speed of the prosodic encoder, reduce the phenomenon of over-fitting and improve the efficiency of extracting prosodic features.

The structure of the prosodic encoder can be of a prosodic convolutional layer, a pooling layer and another prosodic convolutional layer. For the convenience of expression, the embodiment of the present disclosure defines the prosodic convolutional layer located before the pooling layer as a first prosodic convolutional layer, and defines the prosodic convolutional layer located behind the pooling layer as a second prosodic convolutional layer.

In the process of inputting text features and reference speech into the prosodic encoder, text features are directly input into the prosodic convolutional layer, so that text features are compressed by the prosodic convolutional layer, and word-level latent features are obtained from the text features. The reference speech can be pre-processed into a Mel spectrum, which in turn is sequentially input into a first prosodic convolutional layer, a pooling layer and a second prosodic convolutional layer according to the structure of the prosodic encoder. After the Mel spectrum of the reference speech is input, the first prosodic convolutional layer may perform word-level prosodic quantization on the reference speech according to the compressed word-level latent features to obtain prosodic features.

After the first prosodic convolutional layer outputs prosodic features, the pooling layer can perform feature dimension reduction on word-level latent features and prosodic attribute features to obtain prosodic code, so as to reduce the computational complexity of the speech conversion model and reduce the problem of over-fitting and improve the efficiency of feature extraction. After being output in the pooling layer, the prosodic code can be input to the second prosodic convolutional layer to extract the deep-level prosodic features, which can be compressed to the vector quantization layer finally, so as to output the final prosodic features, improve the accuracy of feature extraction, and make the prosodic code obtained in the training process of the speech conversion model more conform to the speaking prosodic of a real person.

In some embodiments, the speech concatenation features, style features, and prosodic features may be simultaneously input into a normalizing flow layer of a priori encoder to increase the complexity of the speech concatenation features, style features, and prosodic features. In addition, according to the temporal alignment module, performing temporal alignment on the speech concatenation features, the style features and the prosodic features after improving the complexity and the audio latent variable, so that the obtained speech code combines the speech concatenation features, the style features and the prosodic features at the same time to shorten the audio gap between the converted speech and the speech of a real person.

In some embodiments, the audio encoder may be constructed based on a pre-trained Hubert model, which may enable the audio encoder to better extract the audio characteristics of the reference speech by pre-training the audio encoder, and the above-mentioned pre-training process is described below:

Firstly, a clustering model based on k-means network is preset, and the clustering model can include a feature extraction layer, a clustering processing layer and a category identification layer. The feature extraction layer employs a self-supervised model, such as the Hubert model described above, which is used to extract features from training data in a pre-training process. At the same time, the feature extraction layer is also used to form a feature extraction portion of the audio encoder. The clustering processing layer is formed based on the K-mens model and is used for clustering the extracted audio features, i.e., clustering audio features of the same category. The category identification layer is used to assign a corresponding category code to the clustered audio features of a certain category.

After completion of the construction of the clustering model, a pre-training of the clustering model may be performed by means of general training data, which may be based on LibriSpeech-960 and AISHELL-3 data, e.g., acquiring speech sample data for two hundred speakers, with a clustering number of 200. In the clustering model, audio feature processing may be performed on the training data by the feature extraction layer, and clustering may be performed on the corresponding audio features by the clustering layer, so that the clustering model can perform clustering processing on speech samples of different speaking categories. It should be noted that the clustering processing refers to automatically performing clustering on sounds with similar sound styles by means of unsupervised training and similarity calculation, and the sounds of the same category may not be of the same speaker, only when the similarity in sound styles reaches a preset similarity threshold.

The category identification layer can perform category encoding on the clustered categories for the subsequently training of the audio encoder, for example, the clustering model clusters the speech sample data to obtain different categories, which can be respectively assigned to the category code of ID1.1, ID1.2, . . . , ID1.9, and the category code can enable each audio feature category clustered by the clustering model to have a unique identification for distinguishing, so as to perform category mapping and encoding in the learning and training process of the subsequent speech conversion model.

It should be noted that, in the above-mentioned clustering model, apart from the feature extraction layer part, the other part does not participate in the construction of the audio encoder; only in the training stage of the audio encoder, the audio encoder is provided with audio feature category encoding; and after the speech conversion model completes the training, the clustering model also does not participate in the inferring work in the application process of the speech conversion model.

After the audio encoder completes the pre-training, the audio encoder can be constructed according to the model constructed after the pre-training and the structure of each layer, and in some embodiments, the audio encoder includes the following parts:

a feature encoding unit is constructed by a Hubert model in the above-mentioned clustering model, which completes cluster pre-training for extracting and encoding audio features of a reference speech;

a category mapping unit is constructed by a mapping layer, where the category mapping unit is used for mapping audio feature category code, i.e., category code corresponding to the audio feature mapping extracted by the feature encoding unit; and a category encoding unit is constructed by an embedded layer, and the category encoding module is used for assigning the audio features extracted by the feature encoding unit to the category code defined in the preceding clustering model during the training process of the audio encoder.

In the training process of the audio encoder, the feature encoding unit and the category mapping unit are initialized first, i.e., some parameters of the Hubert model and the mapping layer are randomly initialized. After initialization, the audio encoder can be trained using the general training data.

In the actual training process of the audio encoder, in addition to the normal model training and parameter updating, the audio encoder can also be trained on the basis of the predictive category code of the category code corresponding to the general training data and the real category code obtained by the above-mentioned clustering model at the same time.

The audio features extracted by the feature extraction unit are mapped by the category mapping unit and the category encoding unit to a category code, which is a predictive category code for the general training data. Then, the Hubert model is used to minimize an average cross entropy of the predictive category code of the general training samples and the real category code given in the previous training process of the clustering model, based on which the loss function of the audio encoder is updated, and the relevant parameters of the audio encoder are updated to complete the training of the audio encoder.

In some embodiments, a variety of training losses may be included in training the speech conversion model, and to this end, in the embodiments of the present disclosure, the training losses may include spectrum losses, divergence losses, decoder losses, stochastic duration predictive losses, and feature matching losses when training generator, and in the embodiments of the present disclosure, the training losses may be represented by:

$$L_{total} = L_{recon} + L_{kl} + L_{dur} + L_{adv} + L_{fm}(G);$$

where $L_{total}$ is the training loss, $L_{recon}$ is the spectrum loss, $L_{kl}$ is the divergence loss, $L_{dur}$ is the stochastic duration predictive loss, $L_{adv}$ is the decoder loss in the training process, and $L_{fm}(G)$ is the feature matching loss of training generator.

In some embodiments, the spectrum loss is the training loss between the training speech and the training synthesized speech. In order to calculate the spectrum loss, the spectral accuracy of the training speech can be obtained, the spectral accuracy of the training synthesized speech can be obtained, and the spectrum loss can be calculated from the spectral accuracy of the training speech and the spectral accuracy of the training synthesized speech according to the following formula:

$$L_{recon} = \|x_{mel} - \hat{x}_{mel}\|;$$

where $L_{recon}$ is the spectrum loss, $x_{mel}$ is the spectral accuracy of the training speech, and $\hat{x}_{mel}$ is the spectral accuracy of the training synthesized speech.

In some embodiments, $L_{kl}$ is KL divergence loss which is a loss between a posteriori distribution estimate and a priori distribution estimate, where the posteriori distribution estimate is a final latent variable obtained by combining a variable obtained from a linear spectrum of the audio through a posteriori encoder with a style vector output by the style encoder and a prosodic code output by a prosodic encoder, and the prosodic code output by the prosodic encoder, and the priori distribution estimate of the latent variable between the given condition text and its information.

In the present embodiment, a posteriori distribution result can be calculated according to the audio latent variable, and the alignment information about the synthesized speech code is acquired, then the priori distribution result is calculated according to the alignment information and the audio latent variable, and finally the divergence loss is calculated according to the posteriori distribution result and the priori distribution result according to the following formula:

$$L_{kl} = \log q_\varnothing(z|x_{lin}) - \log p_\theta(z|c_{text}, A);$$

where $L_{kl}$ is the divergence loss, z is the audio latent variable, $\log q_\theta(z|x_{lin})$ is the posteriori distribution result, $\log p_\theta(z\kappa_{text}, A)$ is the priori distribution result, $c_{text}$ is the preset text, and A is the alignment information.

In some embodiments, the decoder further includes a discriminator for discriminating the synthesized speech obtained after the decoding during the application of the speech conversion model, and when the discriminator cannot discriminate the synthesized speech from the speech of a real person, it is indicated that the accuracy of the synthesized speech has reached the accuracy of the speech of a real person, thereby outputting the synthesized speech.

In a training process of the speech conversion model, the training synthesized speech may be input to the discriminator to obtain discriminant features output by the discriminator and to calculate feature matching losses of the training decoder, where the feature matching losses may be regarded as reconstruction losses for constraining the output of the intermediate layer of the discriminator for adversarial training with the decoder in the training speech conversion model.

In some embodiments, the feature matching loss of the training decoder may be calculated according to:

$$L_{fm}(G) = E_{(x,z)}\left[\sum_{l=1}^{T} \frac{1}{N_l} \|D^l(x) - D^l(G(z))\|_1\right];$$

where $L_{fm}(G)$ is the feature matching loss of the training generator, E is an expression form desired by mathematics, x is a real waveform of a training frequency spectrum, z is an audio latent variable, and T is the number of layers of a discriminator network, $D^l$ obtains the features of the $l^{th}$ layer of the discriminator of $N_1$ features, and G(z) represent the generated features of the decoder after inputting the latent variable.

In some embodiments, $L_{adv} \times L_{fm}(G)$ is the loss of the decoder module, where $L_{adv}$ is the least-squares loss function of the adversarial training, and the discriminator loss can be calculated according to the following formula:

$$L_{adv}(D) = E_{x,z}[(D(x)-1)^2 + D(G(z))^2];$$

where $L_{adv}(D)$ is the discriminator loss, E is the expression desired by mathematics, x is the true waveform of the training spectrum, D(x) represents the discriminant result of the true waveform, G(z) represents the generated feature representation after inputting an latent variable z, and D(G(z)) represents the discriminant result of the generator generated feature G(z).

the losses of the generator can be calculated according to the following formula:

$$L_{adv}(G) = E_z[(D(G(z))-1)^2];$$

$L_{adv}(G)$ is the generator loss, D(G(z)) represents the discriminant result of the feature G(z) generated by the generator, and E is the expression form desired by mathematics.

To this end, a least-squares loss function of the adversarial training may be computed from the discriminator loss and the generator loss, such that the decoder loss is computed from the least-squares loss function of the adversarial training and the feature matching loss of the training generator.

In some embodiments, $L_{dur}$ is a stochastic duration predictive loss, and after a text code of the training text, the mean variance of the prediction and the latent variable Z can be obtained by a temporal sequence alignment module according to an MAS algorithm, and an optimal alignment matrix of a normal distribution after a normalizing flow is passed to calculate the stochastic duration predictive loss.

It can be seen from the above-mentioned technical solutions that the present disclosure provides a pitch-based speech conversion model training method and a speech conversion system, where the method is used for training a speech conversion model, the speech conversion model including a priori encoder, a posteriori encoder, a temporal alignment module, a decoder and a pitch extraction module. According to the embodiments of the present disclosure, a reference speech may be input to the priori encoder and the pitch extraction module to output an audio feature code by the priori encoder and to extract a pitch feature by the pitch extraction module. A linear spectrum corresponding to the reference speech is input into the posteriori encoder to obtain an audio latent variable. In addition, a speech concatenation feature obtained by concatenation of the audio feature code and the pitch feature, and the audio latent variable are input into a temporal alignment module to obtain a converted speech code, and the converted speech code is decoded by a decoder to obtain a converted speech. The training loss of the converted speech is then calculated to determine the degree of convergence of the speech conversion model. In the present disclosure, extracting a pitch feature of a reference speech through a pitch extraction module, and performing concatenation and alignment with an audio feature code, so that the pitch feature of the converted speech is closer to the speech of a real person, thereby improving the pitch similarity of the converted speech in a case of insufficient speech samples.

Reference throughout this specification to "various embodiments", "some embodiments", "one embodiment", or "embodiments", or the like, means that particular features, components, or characteristics described in connection with the embodiment are included in at least one embodiment, and accordingly, appearances of the phrases "in various embodiments", "in some embodiments", "in at least one other embodiment", or "in an embodiment", or the like, throughout this specification are not necessarily all referring to the same embodiment. Furthermore, the particular features, components, or characteristics may be combined in any suitable manner in one or more embodiments. Thus, the particular features, components, or characteristics shown or described in connection with one embodiment may be combined in whole or in part with the features, components, or characteristics of one or more other embodiments without limitation. Such modifications and variations are intended to be included within the scope of the present disclosure.

To the extent that similar elements between the embodiments provided herein are referred to each other, the embodiments provided above are merely exemplary of the general concepts of the present disclosure and are not intended to limit the scope of the present disclosure. For a character skilled in the art, any other embodiment extended according to the solution of the present disclosure falls within the scope of protection of the present disclosure without involving any inventive effort.

While the foregoing is directed to preferable embodiments of the present invention, it will be understood by a character skilled in the art that various changes may be made and equivalents may be substituted for elements thereof without departing from the spirit and scope of the invention.

What is claimed is:

1. A pitch-based speech conversion model training method for training a speech conversion model comprising a priori encoder, a posteriori encoder, a temporal alignment module, a decoder and a pitch extraction module comprising an encoder layer, a filter layer, an intermediate layer, and a decoder layer, wherein the encoder layer, the intermediate layer and the decoder layer form a first encoding branch of the pitch extraction module, and the encoder layer, the filter layer and the decoder layer form a second encoding branch of the pitch extraction module, the encoder layer comprises an average pooling layer and a convolution network, the convolution network comprises a convolutional block comprising a 2D convolutional layer, a batch normalizing layer and a relu function, and a shortcut convolutional layer provided between an input of the convolution network and an output of the convolution network, the method comprising:

inputting a reference speech to the priori encoder and the pitch extraction module, and extracting an audio feature code by the priori encoder and extracting a pitch feature vector of the reference speech through the convolution network;

performing down-sampling on the pitch feature vector by the average pooling layer to obtain a pitch feature code;

decoding the pitch feature code by the decoder layer to obtain the pitch feature;

wherein the pitch feature vector is obtained by means of the following:

extracting a deep-level audio vector by the 2D convolutional layer;

performing accelerated convergence processing on the deep-level audio vector by the batch normalizing layer to extract a convergence pitch feature from the deep-level audio vector; and adding a non-linear relationship to the converged pitch feature via the relu function to obtain the pitch feature vector; or before the step of adding the non-linear relationship to the converged pitch feature through the relu function, extracting a shortcut pitch feature by the shortcut convolutional layer, wherein the shortcut pitch feature is a pitch feature extracted by the shortcut convolutional layer at a speed greater than a speed at which the convolutional block extracts the pitch feature vector, and the shortcut convolutional layer includes only one 2D convolutional layer;

concatenating the shortcut pitch feature and the converged pitch feature to obtain a pitch concatenation feature; and adding the non-linear relationship between the pitch concatenation features via the relu function to obtain the pitch feature vector;

performing feature concatenation on the audio feature code and the pitch feature to obtain a speech concatenation feature;

inputting a linear spectrum corresponding to the reference speech into the posteriori encoder to obtain an audio latent variable;

aligning a temporal sequence of the speech concatenation feature and the audio latent variable by the temporal alignment module to obtain a converted speech code;

decoding the converted speech code by the decoder to obtain converted speech;

calculating a training loss of the converted speech, and outputting the speech conversion model according to a current parameter of a model to be trained if the training loss is less than or equal to a training loss threshold, or performing iterative training on the speech conversion model if the training loss is greater than the training loss threshold, wherein the model to be trained is an untrained converged speech conversion model.

2. The pitch-based speech conversion model training method according to claim 1, wherein the decoder layer comprises a deconvolution layer and the convolution network, and the step of decoding the pitch feature code by the decoder layer comprises:

performing deconvolution calculation on the pitch feature code by the deconvolution layer to obtain a deconvolution feature vector; and decoding the deconvolution feature vector through the convolution network to obtain the pitch feature.

3. The pitch-based speech conversion model training method according to claim 1, wherein the step of aligning the temporal sequence of the speech concatenation feature and the audio latent variable by the temporal alignment module comprises:

acquiring a template speech sequence of the temporal alignment module;

aligning a temporal sequence of the speech concatenation feature and the audio latent variable according to the template speech sequence; and encoding the aligned speech concatenation feature and the audio latent variable to obtain the converted speech code.

4. The pitch-based speech conversion model training method according to claim 1, wherein the speech conversion model further comprises a style encoder, and after the step of performing feature concatenation on the audio feature code and the pitch feature, the method further comprises:

extracting a style feature of the reference speech by the style encoder; and mapping the style feature into the speech concatenation feature to update the speech concatenation feature.

5. The pitch-based speech conversion model training method according to claim 1, wherein the training loss comprises a spectrum loss, and the step of calculating the training loss of the converted speech comprises:

acquiring a spectral accuracy of the reference speech and a spectral accuracy of the converted speech; and calculating the spectrum loss from the spectral accuracy of the reference speech and the spectral accuracy of the converted speech according to the following formula:

$$L_{recon} = \|x_{mel} - \hat{x}m_{el}\|;$$

where $L_{recon}$ is a spectrum loss, $x_{mel}$ is spectral accuracy of the reference speech, and $\hat{x}m_{el}$ is the spectral accuracy of the converted speech.

* * * * *